(12) United States Patent
Thibout et al.

(10) Patent No.: US 7,573,624 B2
(45) Date of Patent: Aug. 11, 2009

(54) PIEZOELECTRIC-MOTOR-DRIVEN TWO-AXIS ORIENTATION TURRET

(75) Inventors: Florent Thibout, Paris (FR); Jacques Robineau, Paris (FR); Jean-Thierry Audren, Paris (FR); Julien Aragones, Paris (FR)

(73) Assignee: Sagem Defense Securite, Paris (FR)

( * ) Notice: Subject to any disclaimer, the term of this patent is extended or adjusted under 35 U.S.C. 154(b) by 0 days.

(21) Appl. No.: 11/866,479

(22) Filed: Oct. 3, 2007
(Under 37 CFR 1.47)

(65) Prior Publication Data
US 2008/0252957 A1    Oct. 16, 2008

(30) Foreign Application Priority Data
Oct. 19, 2006 (FR) .................................. 06 09187

(51) Int. Cl.
G02B 26/08    (2006.01)
(52) U.S. Cl. .................. 359/198.1; 310/323.06
(58) Field of Classification Search ............ 310/323.01, 310/323.02, 323.03, 323.04, 328, 323.06; 359/198, 199, 223
See application file for complete search history.

(56) References Cited

U.S. PATENT DOCUMENTS

| | | | |
|---|---|---|---|
| 3,914,029 A | 10/1975 | Hoplock | |
| 5,172,023 A | 12/1992 | Kawai et al. | |
| 5,223,969 A | 6/1993 | Jeandeau | |
| 6,288,475 B1 * | 9/2001 | Ito et al. | 310/323.01 |
| 6,288,848 B1 | 9/2001 | Shinohara et al. | |
| 6,573,636 B1 | 6/2003 | Iino et al. | |
| 6,674,217 B1 | 1/2004 | Fujimoto | |

FOREIGN PATENT DOCUMENTS

| | | |
|---|---|---|
| EP | 0 518 733 | 12/1992 |
| EP | 0 884 832 | 12/1998 |

OTHER PUBLICATIONS

French Search Report from correspondence French Patent Application No. FR0609187, report dated Apr. 20, 2007.
Hanqi Zhuang and Zvi S Roth, "Modeling Gimbal Axis Misalignments and Mirror Center Offset in A single-Beam Laser Tracking Measurement System" The International Journal of Robotics Research 14(1995) June, No. 3, Cambridge, MA, US.

* cited by examiner

Primary Examiner—Euncha P Cherry
(74) Attorney, Agent, or Firm—Miller, Matthias & Hull (57) ABSTRACT

In the orientation device of a transmission assembly for orienting at least one beam in elevation and/or in bearing, said assembly pivots on a fork about an elevation axis and is driven about this axis by a motor supported by said fork, which fork can pivot on a base about a bearing axis, perpendicular to the elevation axis and driven about this axis by a second motor supported by said base, and at least one of the motors is a travelling-wave piezoelectric rotary motor.

24 Claims, 1 Drawing Sheet

PIEZOELECTRIC-MOTOR-DRIVEN TWO-AXIS ORIENTATION TURRET

FIELD OF THE DISCLOSURE

The present invention relates to an orientation device of what is called "two-axis" orientation head or turret type, and more particularly to a wide-angle orientation turret having exceptional orientation and velocity capabilities allowing it to be applied to various optronic functions requiring a wide angular coverage, high precision, high aiming velocity, small size and low weight.

BACKGROUND OF THE DISCLOSURE

Orientation devices of what is called "two axis" orientation head or turret type, for orienting at least one transmission assembly for transmitting at least one optical and/or electromagnetic beam in elevation and/or in bearing, by rotation of said transmission assembly about an elevation axis and/or a bearing axis respectively are already known.

In these known turrets, the transmission assembly, for example an optical block based on mirrors or prisms, which is capable of receiving an incident light beam to be deflected in order to produce a transmitted beam, is mounted so as to pivot on a fork about a first axis, called the elevation axis, and capable of being rotated about said elevation axis by a first motor supported by said fork, which fork is mounted so as to pivot on a base about a second axis, called the bearing axis, perpendicular to the elevation axis, and capable of being rotated about said bearing axis by a second motor supported by said base, which is mounted on a platform that may be a terrestrial and stationary platform or may be a moving platform mounted on a terrestrial vehicle, a ship or an aircraft.

On existing orientation devices of this type, the two motors are rotary electric motors, that is to say conventional electromagnetic motors, which may be torque motors or stepper motors.

To deliver high torques needed to obtain sufficient angular accelerations and/or angular velocities to obtain homing times of an orientation turret over a given sector in space that are appropriate to the various envisaged optronic functions, these motors are heavy and bulky, hence a large inertia of the turret, thereby having a negative impact on the desired performance characteristics. In addition, to increase the delivered torque while keeping the electric motors within reasonable weight and volume ranges, the drive for the parts moving in elevation and in bearing is provided by the electric motors via transmissions with mechanical speed reducers. However, the use of mechanical reducers, which are necessary in the motor drive units of orientation turrets currently employed, incurs, in turn, drawbacks in terms of costs, the presence of dry friction, anti-backlash means and also servocontrol in order to compensate for the drawbacks, that is to say to guarantee as precise a positioning as possible of a beam, in particular an optical beam, emitted by the orientation turret.

Admittedly, the use of torque motors makes it possible to avoid speed and backlash reducers, however these motors do not have a torque/mass ratio which is high to the point of allowing a volume and mass reduction propitious to the use of an orientation turret having torque motors on small platforms (aircraft or terrestrial vehicles) by the natural integrability of such a turret.

When the electric motors of existing orientation turrets are stepper motors, their essential drawback is that the elementary step of these motors is not small enough, thereby resulting in a lack of precision in the orientation of the turrets.

Thus, the use of electromagnetic motor drive units entails a mass, a volume, an energy consumption and a cost that it would be advantageous to reduce, these parameters being crucial in systems onboard aircraft, or in terrestrial vehicles in which space is limited.

Existing orientation devices of this type, based on the use of conventional technologies, therefore do not make it possible to achieve the desired performance characteristics as mentioned above, namely high angular coverage with very high precision and very high aiming velocity, simultaneously with low volumes, masses and costs, advantageously enhanced by great structural simplicity, in particular because the conventional motor drive technologies do not allow a high torque/mass ratio to be achieved except at the cost of a mass and volume performance that does not permit integration in an orientable turret having a structure suitable for the applications and uses envisaged by the present application. Specifically, for such orientation turrets, the optomechanical architecture must exhibit compactness and centring characteristics that are propitious to the equilibrium and to the general compactness an orientation device according to the present invention.

SUMMARY OF THE DISCLOSURE

Consequently, a particularly advantageous feature of the invention is to produce an orientation turret, in particular for orienting a laser optical beam, with a homing time over any sector in space lying within at least one hemisphere (a space covering more than $2\pi$ steradians) and as short as possible, in particular with a 90° homing time for an optical line of sight of less than 100 ms, preferably less than 50 ms.

Another objective of the invention is to produce an orientation turret of the abovementioned type that provides the most precise orientation possible, and permits the motor to undergo a displacement with the smallest possible elementary step, for example of the order of 1 microradian.

An additional objective of the invention is also to equip an orientation turret with a motor drive unit for the parts that orient the beam or beams that provides a higher torque per unit mass. This is because a motor drive unit with a high torque makes it possible not only to dispense with a speed reduction device, but also to minimize the impact of the mass of the motors themselves on the inertial effects of the turret, thus enabling the displacements and orientations of the beam (s), particularly optical beam(s), to be better controlled, while at the same time minimizing the overall volume of the turret.

Taking the foregoing into consideration, it would be particularly advantageous to produce an orientation turret that can achieve a 90° rotation of a line of sight in less than 100 ms, making it possible to minimize the volume, the mass and the electrical consumption, to minimize the parts external to the carrier to which such an orientation turret is fastened, and therefore to minimize the deleterious effects of drag and of reduced radius of action, to eliminate any speed reduction device, to increase the integrability on an aircraft (or whatever terrestrial or naval vehicle or installation), to increase the value of the torque per unit mass, to have a spatial addressing or coverage equal to or greater than $2\pi$sr, and to be simple and inexpensive to operate and to produce.

For this purpose, the invention proposes an orientation device of the abovementioned type, at least one of the first and second motors of which is a travelling-wave piezoelectric rotary motor comprising:

a stator comprising a cogged stator ring of circular cross section, supported by said fork or said base respectively;

a rotor comprising an annular rotor slider of circular cross section, substantially coaxial with said cogged stator ring about the elevation or bearing axis and being pressed axially against said stator ring by a prestressing force; and at least one piezoelectric ring with excitation sectors for exciting said cogged stator ring, said piezoelectric ring also being essentially coaxial with said cogged stator ring about the corresponding elevation axis or bearing axis and applied against a radial face of said cogged stator ring so as to be able to excite said cogged stator ring and to cause the rotary displacement of the rotor when said excitation sectors of said piezoelectric ring are supplied with an appropriate electrical current.

Travelling-wave piezoelectric rotary motors are actuators known in particular from patent documents U.S. Pat. Nos. 6,288,475, 6,573,636, 6,674,217 and EP 0 884 832, to which further reference may be made for details about the structures that they may have and the ways of controlling and operating them.

To reduce the homing time of an orientation device according to the invention, each of the first and second motors is advantageously a travelling-wave piezoelectric rotary motor.

To reduce the inertia, and therefore to improve the homing time performance by increasing the angular accelerations and velocities that can be achieved, the annular rotor slider of at least one piezoelectric rotary motor, and preferably of each of these two motors, is made to rotate as one with a driven member integral with said transmission assembly (advantageously a laser-compatible optical block) or with said fork respectively and rotated about the corresponding elevation axis or bearing axis by said piezoelectric rotary motor.

As regards the part moving in elevation of the device according to the invention, it is advantageous for said driven member integral with said transmission assembly to be a first support for said assembly, which is mounted so as to swivel via said first support about the elevation axis on a first of two arms of said fork, between which arms said transmission assembly pivots.

According to a first embodiment of this part moving in elevation, the first motor is a piezoelectric rotary motor that has a rotor in which the annular rotor slider is directly integrated into an axial end of an elevation drive shaft substantially coaxial with said rotor slider about the elevation axis and made to rotate as one with said first support of the transmission assembly about said elevation axis.

To reduce the inertia further, it may be advantageous to reduce the axial dimension of the elevation drive shaft, to the point where this drive shaft disappears in practice, in which case the annular rotor slider of the rotor of the first piezoelectric rotary motor is, according to a second embodiment, directly integrated into said first support for the transmission assembly, being produced so as to project coaxially about the elevation axis on a radial face of said first support that faces the cogged stator ring of said first motor, which stator ring is supported by said first arm of the fork.

In these two embodiments of the part moving in elevation, said transmission assembly may advantageously be fastened between said first support and a second support, which is mounted so as to swivel about the elevation axis in the second arm of said fork by means of an axially sliding arrangement that couples the transmission assembly to an elevation encoder assembly capable of measuring the rotation of the transmission assembly about the elevation axis.

In this case, and in an advantageously simple and practical embodiment, said second support for the transmission assembly is extended, along the elevation axis, by a cylindrical trunnion mounted so as to rotate about the elevation axis and to slide axially in a coaxial bore made in the hub of a disc of circular cross section rotationally guided about the elevation axis in the second arm of said fork by at least one rolling bearing, said hub also being extended, coaxially about the elevation axis, by a cylindrical end-piece engaged coaxially in the elevation encoder assembly, preferably comprising an optical encoder mounted in the second arm of said fork, said disc being rotationally linked to said second support by means for preventing rotation about said elevation axis.

As regards the stator of the first piezoelectric rotary motor, when the part moving in elevation is produced as presented above, the cogged stator ring of the stator and, optionally, so that at least one piezoelectric ring of the first motor are advantageously supported, in a simple and compact manner, coaxially about the elevation axis, by projecting on a radial face, turned towards said transmission assembly, of a flange fastened to said first arm of the fork, in order to support said first motor.

As regards now the part moving in bearing, the driven member integral with the fork is advantageously a support-plate of the fork and arranged in the form of an annular disc via which the fork is mounted so as to swivel about the bearing axis on an annular plate of the base, the central orifices of the disc of the fork and of the plate of the base allowing passage of at least one beam and/or means for emitting and/or receiving at least one beam towards said transmission assembly and/or coming from the latter.

By analogy with the part moving in elevation, and for the same reasons, particularly for simplicity, compactness and inertia reduction reasons, the part moving in bearing may advantageously be arranged in such a way that the annular rotor slider of the rotor of the second piezoelectric rotary motor is directly integrated into an axial end of a bearing drive shaft, which is tubular and integral with said annular disc of the fork and emerges, along the bearing axis, facing said transmission assembly, through the central orifice of said annular disc for passage of at least one beam and/or of means for emitting and/or receiving at least one beam towards the transmission assembly and/or coming from the latter.

However, according to a second embodiment, which is simpler and of lower inertia, and again by analogy with the part moving in elevation, the compactness of the part moving in bearing may be improved by reducing the axial dimension of the bearing drive shaft, possibly up to the point of eliminating the latter, in which case the annular rotor slider of the rotor of the second piezoelectric rotary motor is directly integrated into said annular disc of the fork, by projecting on that radial face of said annular disc which is turned towards the base.

Whatever the embodiment of the part moving in bearing, it is advantageous, again to simplify the structure and to reduce its volume and mass, for the cogged stator ring of the stator and, optionally, said at least one piezoelectric ring of the second motor to be supported so as to project, coaxially the bearing axis, on a radial face of said annular plate of the base which is turned towards the said fork.

In addition, to measure the angular rotation of the transmission assembly about the bearing axis, it is advantageous for the second piezoelectric rotary motor to be coupled on the base to a bearing encoder assembly capable of measuring the angular rotation of said fork about the bearing axis.

In one particularly compact embodiment the second piezoelectric rotary motor and the bearing encoder assembly are associated in a motor/encoder assembly mounted on the base so that the second motor and the bearing encoder are located substantially on either side of said annular plate of the base.

However, irrespective of the embodiment in question, to reduce the friction forces and to improve the rotational guiding of the moving parts about their respective elevation or bearing axes, it is advantageous for said annular rotor slider of the rotor of the first and second piezoelectric rotary motors and the member(s) made to rotate as one with said slider to pass through rolling-bearing mechanisms supported by said fork and said base respectively.

As regards the transmission assembly, this is advantageously a laser-compatible optical block comprising an assembly of at least two mirrors, or a biprism, preferably of the type described in FR 2 882 440 or FR 2 882 441, in which documents said biprism, with which an orientation turret capable of receiving an incident coherent light beam and of deflecting it in order to produce a transmitted beam is equipped, is itself capable of splitting the transmitted beam into two sub-beams, the biprism being associated with an optical retardation device capable of introducing an optical path difference between the two sub-beams that is greater than the coherence length of the incident beam, so as to make the two sub-beams mutually non-coherent and thus prevent any interference between these two sub-beams.

Other advantages and features of the present invention will become apparent from a particular exemplary embodiment, described below by way of non-limiting example with reference to the appended drawings in which:

DETAILED DESCRIPTION

Figure 1:
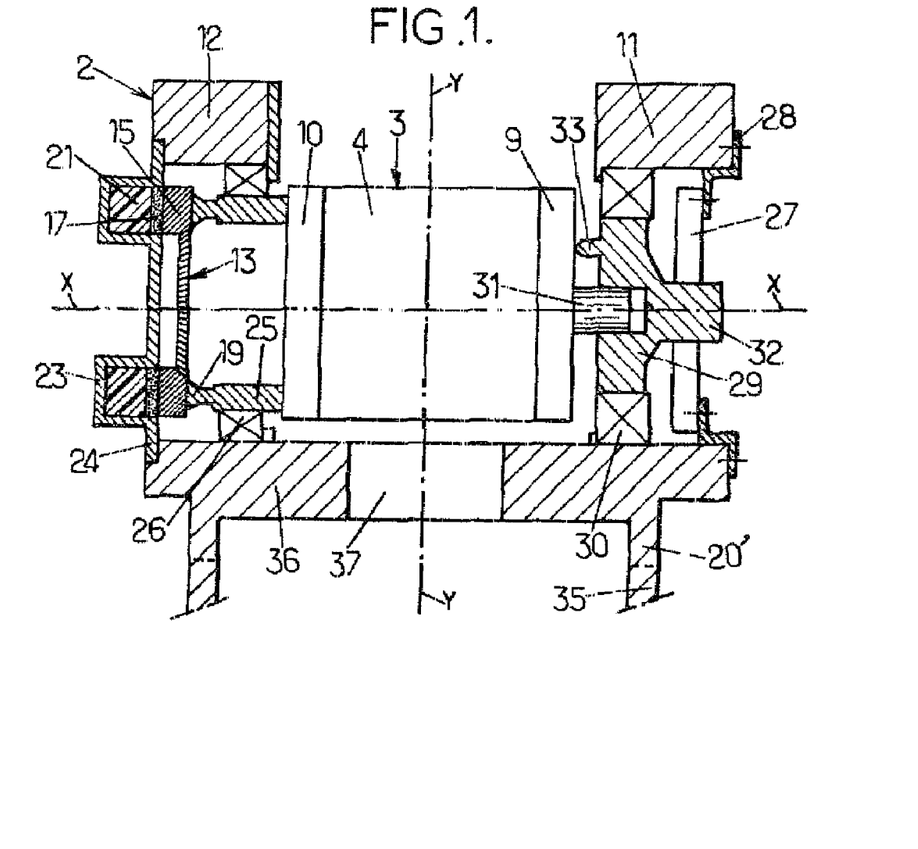
FIG. 1 is a partial schematic view of the orientation turret according to the invention and shown in cross section along the elevation axis of the turret.
Figure 2:
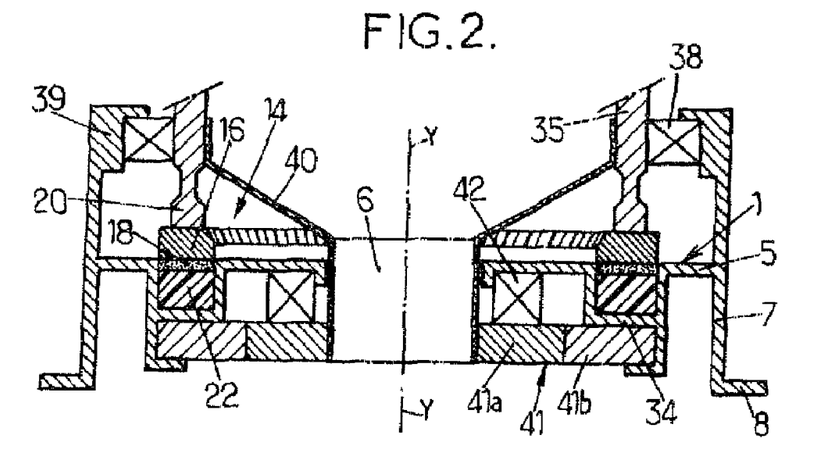
FIG. 2 is a partial schematic view of the orientation turret according to the example of FIG. 1, shown more precisely in a sectional view along the bearing axis of this turret.

The orientation turret of FIGS. 1 and 2 essentially comprises three main subassemblies, which are a mechanical subassembly, a laser-compatible optical block and a motor drive unit with servo control.

The mechanical subassembly comprises a base 1 (FIG. 2), on which a fork 2 (FIG. 1) is mounted so as to rotate about a bearing axis YY, and a moving part 3 mounted so as to rotate on the fork 2 about an elevation axis XX perpendicular to the bearing axis YY.

Furthermore, the base 1 is advantageously mounted on a support platform via a fourth main subassembly, which is a gyrostabilization device, which is not shown as it may be of any known suitable type, for example with a "three-axis" gyroscopic sensor core housed in a casing and linked via a suspension to the base 1, beneath which the casing is fastened.

The base 1, the fork 2 and the part 3 moving in elevation are constituted so as to allow the rotation of an optical block 4, and therefore also of a line of sight of the latter, along the elevation axis XX and bearing axis YY, so as to cover an orientation space comprising at least one hemisphere, that is to say at least $2\pi$ steradians, without a dead angle, and allowing the zenithal sight.

The optical block 4, which is compatible with laser, in particular infrared laser, sources and is integrated into the part 3 moving in elevation, may comprise mirrors, but advantageously consists, in this example, of a biprism 4 fastened via its bases between two supports 9 and 10 mounted so as to swivel, between the two arms 11 and 12 of the fork 2, about the elevation axis XX, which is perpendicular to the bases of the biprism 4 and passes through the geometrical centre of the latter, whereas the bearing axis YY is parallel to the bases of the biprism 4 and also passes through its geometrical centre.

The biprism 4 is intended to receive at least one incident coherent light beam, for example emitted by a laser source (not shown) housed in the base 1 or by a target illuminated in the space and reflecting a beam towards the biprism 4, which is capable of deflecting the incident beam in order to produce a transmitted beam and of splitting the transmitted beam into two sub-beams directed, respectively, onto a target in a sector of the space covered or onto an imaging system (not shown) housed in the base 1, for example a thermal camera, the biprism 4 being associated with an optical retardation device capable of introducing an optical path difference between the two sub-beams which is greater than the coherence length of the incident beam. For this purpose, the biprism 4 may comprise two prisms made of different materials, as described in FR 2 882 440, so that the difference in refractive index between the prisms introduces said optical path difference, but, as a variant, the biprism may comprise an optical plate mounted so as to move between the two prisms in order to constitute the optical retardation device, as described in FR 2 882 441. In both constructions, the biprism is compatible with the use of a laser, and in particular compatible with the spectral bands used for aiming the turret in the various possible types (passive, active, three-band) of tracking, without generating interference, either in transmission or in reception.

The motor drive subassembly consists of two travelling wave piezoelectric rotary motors, one 13 of which is an elevation motor, causing the part 3 moving in elevation to rotate about the elevation axis XX, and the other 14 of which is a bearing motor, causing a part moving in bearing, consisting mainly of the fork 2 and the components supported by the latter, to rotate about the bearing axis YY.

Like any travelling wave piezoelectric rotary motor, each of the motors 13 and 14 comprises:

a stator, produced in the form of a cogged stator ring of circular cross section, 15 or 16 respectively, supported by a rigid support;

a ring, 17 or 18 respectively, of piezoelectric ceramic elements defining excitation sectors of the corresponding stator ring 15 or 16, when the excitation sectors are supplied with phase-shifted sinusoidal electrical currents generating a travelling wave, which axially deforms the stator ring 15 or 16, said stator ring being applied, via its axial-end radial face turned towards its rigid support, against the corresponding piezoelectric ring 17 or 18 thus interposed between the rigid support and the corresponding stator ring 15 or 16, with which the piezoelectric ring 17 or 18 is coaxial;

a rotor produced in the form of an annular rotor slider of circular cross section, 19 or 20 respectively, which is pressed substantially axially against the corresponding stator ring 15 or 16 by an axial prestressing force; and thrust means, 21 or 22 respectively, suitable for pressing the cogged stator ring 15 or 16 axially against the corresponding annular rotor slider 19 or 20 with a prestress.

Thanks to these thrust means 21 or 22, the travelling-wave axial deformation of the stator ring 15 or 16 by the corresponding ring of piezoelectric elements 17 or 18 causes the corresponding annular rotor slider 19 or 20 to rotate in the opposite direction to the direction of travel of the travelling wave on the stator ring 15 or 16, in a known manner, the rotor slider 19 or 20 being driven by friction of the cogs of the stator ring 15 or 16 against the facing contact surface on the rotor slider 19 or 20, the quality of the contact being the key factor for uniformity of operation of the motor and partly determining the maximum torque of the motor. The rotor slider 19 or 20 is coaxially prestressed statically against the corresponding stator ring 15 or 16 in order to obtain an appropriate contact force, for example of about 200 N for a motor having a diameter of 50 to 60 mm.

For this purpose, each of the motors 13 and 14 is advantageously produced using the teachings of Patent Application FR 06/00170, so that the rigid support of the corresponding stator ring 15 or 16 is shaped so as to annularly support this stator ring 15 or 16 in such a way that the support forces are applied to this stator ring 15 or 16 substantially symmetrically with respect to the cylindrical mid-plane of this ring, and, simultaneously, the corresponding annular rotor contact slider 19 or 20 is integral with the rotary part to be moved, in this case the support 10 of the biprism 4 in respect of the elevation motor 13 and the fork 2 in respect of the bearing motor 14.

In the embodiment according to FIG. 1, the rigid support for the stator ring 15 and for the piezoelectric ring 17 comprises an annular support ring 23, coaxial about the elevation axis XX, subjacent to the stator ring 15 and projecting axially towards the outside of the arm 12 of the fork 2, so as to define an annular groove of rectangular cross section in a radial flange 24 (relative to the elevation axis XX) for closing of the external axial end of a coaxial bore passing through the arm 12, this flange 24 being fastened, for example by screwing of its periphery, into the arm 12, and intended to support the static components of the elevation motor 13, namely the stator ring 15, the piezoelectric ring 17 and the thrust means 21. These thrust means 21, delivering the prestressing force pressing the rotor slider 19 axially against the stator ring 15, consist, in this example, of an annular body that is elastically deformable axially, housed in the rigid support ring 23, and thus interposed between, on the one hand, the bottom of this support ring 23 and, on the other hand, the piezoelectric ring 17 and the cogged stator ring 15, which extends, relative to the flange 24, so as to project towards the inside of the fork 2, and more precisely towards the inside of the axial bore of the arm 12 of this fork 2. The annular body constituting the thrust means 21 is, in a simple and inexpensive embodiment, an annular block made of an elastically deformable material, for example an elastomer. The piezoelectric ring 17 may also be housed, at least partly, in the support ring 23 or, on the contrary, projecting with the stator ring 15 relative to the flange 24 towards the inside of the fork 2.

This stator ring 15 is thus prestressed via its radial face (relative to the elevation axis XX) which is opposite that via which the stator ring 15 is in contact with the piezoelectric ring 17, against a radial face of the annular rotor slider 19 directly integral with or integrated into an axial end of an elevation drive shaft 25 that is tubular, coaxial with the stator ring 15, with the piezoelectric ring 17 and with the annular elastomer block 21, and preferably of the same average diameter as them, this tubular shaft 25 being directly integral, via its other axial end, with the lateral support 10 of the biprism 4 and rotationally guided coaxially about the elevation axis XX by a rolling bearing 26 having balls or other rolling bodies, which is mounted radially to the outside of the shaft 25, between the latter and the arm 12 of the fork 2, in order to rotationally guide the part 3 moving in elevation in this arm 12 of the fork 2.

Thus, the stator ring 15 ensures that the part 3 moving in elevation is rotated directly thanks to the direct integration of the annular rotor slider 19 on the elevation drive shaft 25 of this moving part 3, this arrangement being made possible owing to the fact that the elementary step of the piezoelectric motor 13, that is to say the smallest displacement of this motor, is a few microradians in respect of a motor 13 having a diameter of around 50 to 60 mm and controlled by a very precise position feedback loop, thanks to an optical angular encoder 27, held in the external end portion of a coaxial bore of the arm 11 of the fork 2 by a screwed flange 28, whereas the rotor of the encoder 27 is rotationally linked to the biprism 4 via a coaxial disc 29, rotationally guided in the arm 11 of the fork 2 by a second rolling bearing 30, having balls or any other suitable rolling elements, with an axially sliding arrangement of a cylindrical trunnion 31, integral with the support 9 of the biprism 4 and engaged axially so as to slide in a coaxial bore of the hub of the disc 29 which disc is itself extended towards the optical encoder 27 by a coaxial cylindrical end-piece 32. In addition, the disc 29 is made to rotate as one with the support 9 and with the biprism 4 by a member 33 for rotationally linking the disc 29 and the support 9.

As a variant, so as to further reduce the axial size of the part 3 moving in bearing, and therefore to reduce the inertia of the latter, the tubular elevation drive shaft 25 may be omitted and the annular rotor slider 19 is produced directly as a coaxial annular projection on that radial face of the support 10 which is turned towards the flange 24 and the cogged stator ring 15, against which the rotor slider 19 is pressed by a prestress. In this variant, the part 3 moving in elevation may be rotationally guided, on the side facing the elevation motor 13, by the rolling bearing 26 mounted radially about the support 10 of the biprism 4 and between this support 10 and the arm 12 of the fork 2.

In the two embodiments of the elevation motor 13 that have just been described, the stator ring 15 and the annular rotor slider 19, which are prestressed axially, (along XX) against each other, always appear as an axial projection between the flange 24, the rigid support ring 23 of which at least partly houses the thrust means 21 on the one hand, and the support 10 of the biprism 4 on the other.

As regards the bearing piezoelectric rotary motor 14, its construction may be similar to that described above in the case of the elevation motor 13. This is because the base 1, which comprises a radial circular and annular plate 5 (relative to the bearing axis YY) having a central circular orifice 6, the periphery of said base being connected via a tubular skirt 7 to a free rim 8 having points for fastening the base 1 to a platform, is such that its annular plate 5 has a rigid support ring 34, similar to the rigid support ring 23 of the flange 24, that is to say one that is annular and coaxial about the YY axis, of rectangular cross section and projecting on the plate 5 on the opposite side from the annular rotor slider 20, in order to define an annular groove housing the thrust means 22, which are preferably also made in the form of an annular block of an elastically deformable material, such as an elastomer, interposed between this support ring 34 on the one hand, and the piezoelectric ring 18 and the cogged stator ring 16 on the other, the latter being at least partly projecting above the annular plate 5, and which the elastomer block 22 keeps prestressed against the annular rotor slider 20 directly integral with or integrated into the lower end (see FIG. 2) of a tubular coaxial drive shaft 35 for rotating the fork 2 and the components mounted on the latter, about the bearing axis YY, the other axial end of the shaft 35 being made to rotate as one with the fork 2 about the YY axis and preferably, as shown in FIG. 1, with a single part with a support-plate 36 for the fork 2, this support-plate 36 being made in the form of a circular disc having a central orifice 37 substantially in the axial extension (along the bearing axis YY) of the central orifice 6 of the annular plate 5 of the base 1.

Thus, the part moving in bearing, essentially consisting of the fork 2 and the components that it supports, and of the bearing drive shaft 35, is directly rotated by the cogged stator ring 16 driving the annular rotor slider 20 as a single piece with this shaft 35, which is guided about the bearing axis YY by a rolling bearing 38, having balls or any other suitable rolling elements, which is for example held on the base 1 by a tubular support 39.

As a variant, the annular rotor slider of the motor 14 may be produced as shown at 20' in FIG. 1, being produced directly as a projection beneath the lower radial face of the annular disc 36 for supporting the two arms 11 and 12 of the fork 2, in the case in which the bearing drive shaft 35 is omitted, or reduced to its simplest expression, so that this annular rotor slider 20' comes directly into contact with the cogged stator ring 16 of the bearing motor 14, the rolling bearing 38 then being able to rotationally guide radially about the lower portion of the annular disc 36 and between this lower portion and the annular support 39 fastened to the base 1.

Furthermore, in the example having a bearing drive shaft 35 (see FIG. 2), a partially frustoconical tubular member 40 makes it possible for the shaft 35 to rotate as one with the rotor 41a of an angular encoder 41, the stator 41b of which is held by the base 1, for example beneath the rigid support ring 34 for the non-rotating components of the motor 14, as shown schematically in FIG. 2. In this arrangement, a rotational guiding about the bearing axis YY may also be provided by another rolling bearing 42 mounted between, on the one hand, the rotor 41a of the angular encoder 41 and, on the other hand, an annular housing formed on the base 1, around the central orifice 6 of its annular plate 5.

In the two embodiments described above in which the fork 2 is driven in bearing by the bearing motor 14, the cogged stator ring 16 and the annular rotor slider 20 or 20' always face each other and are axially projecting respectively from the circular plate 5 of the base 1, which supports the non-rotating portions of this motor 14, and, on the other side, from the annular plate 36 that constitutes the base of the fork 2.

In both cases, the bearing motor 14 is produced as a motor with a hollow or tubular shaft driving the fork 2 in bearing, while still defining a central passage, thanks to the central orifices 6 and 37, for the optical (for example laser telemetry and imaging) beam or beams necessary for the uses of the turret, especially in aiming mode, in order to provide passive or active tracking, or even in scanning mode, to provide a search.

The orientation turret thus produced has a very simplified structure providing a high operating speed, and it makes it possible to achieve a 90° line-of-sight homing performance of the biprism 4 in less than 100 ms, thanks to the piezoelectric motor drive unit having a high torque/mass ratio, very much greater (by around three to four times) than that of conventional electromagnetic motors, which ratio is further improved owing to the very low inertia of this turret, in which the low mass of the motors 13 and 14 themselves, because of the simplicity and compactness of their structure and the small number of their constituent components, makes it possible to further reduce the inertia of the orientation turret. As a result, not only the torque/mass ratio may be very high, but also the maximum torque may be obtained practically instantly, thereby making it possible to achieve very high angular accelerations of around 3000 rad/s$^2$.

In addition, this structure makes it possible to benefit from the rolling bearings, such as 26 and 38, of the turret for integrating the motors 13 and 14, thanks to the direct integration of the rotors 19 and 20 in the members (25, 35) to be rotationally driven, hence an additional simplification of the design, and also a larger reduction in the number of mechanical parts, and therefore in the mass and volume of the turret.

Furthermore, in the part or parts to be rotated about the bearing axis YY, a central volume may be cleared, in the bearing drive shaft 35 and/or in the bearing encoder 41, for passage of at least one optical beam or for the integration of any other device requiring an axial arrangement along the bearing axis YY.

Also as a variant, the angular encoder 41 and the bearing motor 14 may be produced in the form of a bearing motor/encoder unit, which is mounted on the base 1 in such a way that the motor 14 and the encoder 41 are substantially on either side of the annular plate 5 of the base 1, the motor 14 being essentially on that side of this plate 5 which is turned towards the fork 2, whereas the encoder 41 is on the other side, protected inside the tubular skirt 7.

Alternatively, it is also possible to drive the support-plate 36 for the fork 2 via a motor/encoder assembly having a solid shaft, offset from the bearing axis YY and capable of driving the support-plate 36 via a belt or a gear.

According to yet other variants, it is possible for the thrust means 21 and 22 not to be annular bodies made of an elastomer, but arrangements in accordance with other embodiments described in FR 06 00170, such as sealed tubular bodies defined by at least one elastically deformable wall, and preferably two opposed lateral walls, substantially in the form of single or multiple C or S, joined in a sealed manner to the corresponding stator ring 15 or 16 and filled with a pressurized gas, or else two sets of uniformly distributed suspension arms interposed between the corresponding stator ring 15 or 16 and two stationary support rings constituting the corresponding rigid support, which are placed radially on either side of the stator ring 15 or 16, one on the inside and one on the outside, and both being radially away from the stator ring 15 or 16, the suspension arms having a C and/or S general shape in order to be elastically deformable and symmetrically interposed between the corresponding stator ring 15 or 16 and the two stationary support rings respectively.

Thanks to the angular encoders 27 and 41, the two piezoelectric motors 13 and 14 are advantageously servocontrolled according to a control law based on a specific behaviour model. This control law uses a specific motor supply card and takes into account the behaviour of the motor and also the non-linearity of the operating frequency as a function of the speed so as to be able to cover, without restriction, the operating range of the motor in the frequency-speed space without the risk of stalling.

The use of this control makes it possible to take full advantage of each motor 13 or 14 in terms of torque, speed and positioning precision for all displacements.

The motors 13 and 14 are servocontrolled by speed and position feedback loops having nonlinear characteristics specific to the piezoelectric motors.

The speed feedback loop, which is the lowest-level loop, includes the speed/frequency characteristic of the motor 13 or 14. This characteristic is measured at a given operating temperature and the thermal effects (variations in operating temperature) on the behaviour of the motor 13 or 14 are compensated for. Advantageously, the piezoelectric rotary motor 13 and/or 14 is controlled as described in French patent FR 06 06438. In addition to this model, intended to linearize the behaviour of the motor, the speed feedback loop is equipped with a linear corrector.

The position feedback loop (of higher level) includes a non-linear corrector, which takes into account the dynamics of the motor 13 or 14. This feedback loop generates speed setpoints that allow the optical parts 4 to adopt the commanded positions, avoiding stalling phenomena associated with setpoints incompatible with the operating range of the motor 13 or 14.

The feedback loops of the motor-driven shafts are equivalent and also make it possible to introduce tracking or stabilization information coming from sensors, such as rangefinders or gyrometer.

Thus, each part rotating about an axis (elevation or bearing axis) is servocontrolled in terms of position and/or speed, whilst still controlling the rotation torque and/or acceleration of the moving part in question (in elevation or in bearing).

Excluding the nadir, it is possible to stabilize the beam only with the orientation device of the invention. This is because such an innovation is permitted thanks to the following architectural choices:

a piezoelectric direct drive motor unit and a variable control law, making it possible to achieve line-of-sight accelerations of 3000 rad/s$^2$;

the optical transmission 4/line-of-sight orientation assembly is inertially centred with reduced inertia; and the integration of high-resolution encoders 27 and 41 of known types.

By using all these techniques, it is possible to use the device for orienting the line-of-sight according to the invention in aiming mode and in stabilization mode. The very high bandwidth of orienting the parts moving in elevation and in bearing makes it possible to propose the architecture described above and the principle of inertial stabilization. This results from the fact that, in the orientation device proposed by the invention, the piezoelectric motor drive unit is fully exploited in order to control the inertia stabilization of the line-of-sight, including at high frequencies. This is because, whereas conventional "two-axis" orientation devices rely on the inertia of the optronic load or of the stabilization mirrors to handle the high frequencies of the destabilization spectrum, the orientation device according to the invention allows these to be actively compensated.

It is well known that a travelling-wave piezoelectric rotary motor is blocked in the rest state by dry friction when the excitation sectors of the piezoelectric ring are not supplied and that it has a brake when it is supplied (fluid friction). Moreover, it has high torque characteristics, making it possible to achieve, as already mentioned, angular accelerations of around 3000 rad/s$^2$.

The orientation device according to the invention employs at least one and preferably two piezoelectric rotary motors, benefiting from their torque characteristics to mitigate the brake or blocked state. Each of the two piezoelectric motors may be used within its entire bandwidth, not limited by the servocontrol, in order to compensate for the high destabilization frequencies, without using the inertial aspect of the optronic load or the mirrors or the biprism 4. One consequence of this choice, specific to the invention, is the ability to produce a very compact orientation turret. Its mechanical arrangement is such as to minimize the inertias of the moving parts, and also the volume and the total mass of the orientation turret. The parts moving in elevation and in bearing are balanced, that is to say that their centre of gravity lies on the bearing axis in respect of the part moving in bearing, and very substantially on the intersection of the elevation axis and the bearing axis in respect of the part moving in elevation, so as to avoid rotational movements of the line-of-sight that are induced by the linear accelerations on the unbalanced masses.

Finally, the speed and/or position feedback loop may, as already mentioned above, advantageously incorporate a gyrometer for inertial stabilization of the line-of-sight, and also a fine stabilization device for overcoming the known drawback in stabilizing "two-axis" turrets at the nadir and for compensating for the residual movements of the line-of-sight output by the orientation turret.

In addition to the aforementioned advantages, the orientation turret according to the invention compensates for vibrations, by an active method, solely thanks to the higher servocontrol bandwidth at high frequencies, by fully exploiting the performance characteristics of the piezoelectric motors, made possible by the novel optomechanical architecture in terms of inertial servocontrol of the line-of-sight at high frequencies, which is provided by the orientation turret according to the invention.

Thus, a simplified, rapid optical-beam orientation turret is obtained that has a torque per unit mass three to four times higher than that of equivalent electromagnetic torque motors known from the prior art, thereby making it possible to minimize the impact of the mass of the motors themselves on the inertia of the optronic platform and to dispense with a device for reducing the speed/increasing the torque needed in the devices according to the prior art, and with rapid and precise control of the optical beam, the smallest displacement of each motor 13 or 14 being estimated to be a few microradians for a motor about 50 mm in diameter.

It should also be noted that the beam orientation/stabilization turret according to the invention is not only well suited to all beam aiming systems for terrestrial, naval and airborne applications, but also to panoramic optronic search systems, when the turret according to the invention is used as a panoramic scanning turret using the so-called "step and stare" principle without an additional special counter-rotation device.

This is because with an optomechanical device according to the invention, a step-and-stare system without a counter-rotation plate and without a stabilization block can be produced, in which all the functions are fulfilled by just the optomechanical line-of-sight orientation/stabilization and counter-rotation device according to the present invention.

Within the context of air safety, the development of automatic detection and avoidance systems requires the development of optomechanical turrets capable of orienting an optical (imaging and laser) line-of-sight within a panoramic space covering 360° in bearing and at least some 30° in elevation. In such an automatic detection and avoidance system, the search device, used to detect aircraft in the region of the carrier platform and to track them in the nearby airspace, principally consists of an optomechanical panoramic scanning turret associated with an optronic passive tracking device provided with the telemetry function, with a laser and with an electronic control unit. The optomechanical turret of such a search device must meet the specifications in terms of:

spatial covering: the optomechanical architecture of the search device may be based on a biprism, a two-mirror head or a four-mirror head, controlled in elevation and in bearing, which gives the turret a spatial covering, greater than 2π sr., making it possible to cover at least a 30° field in elevation centred on the horizon and compensable by at least ±45° in elevation (in order to keep the search plane horizontal) and 360° in bearing; and spatial addressing velocity (20° of line-of-sight in bearing in a time of less than 50 ms): the displacement from one image acquisition position to another is the main contributor to the panoramic scanning time, since the average optical integration time for image acquisition is in the order of 1 ms, whereas the homing time from one image position to the next one in order to cover the 360° panorama takes tens of milliseconds and, moreover, the intended panoramic refresh rate is around 1 to 2 Hz.

Such a velocity performance is obtained using an orientation turret according to the invention, simultaneously benefiting from a low inertia of the optomechanical parts and from a travelling-wave piezoelectric motor drive unit that provides a very high torque per unit mass, as already mentioned above.

Furthermore, a search device according to the prior art fulfils the line-of-sight step-and-stare function using an orientation turret rotating at constant speed, the induced movement of the line-of-sight of which is compensated for by a counter-rotation device (plate or mirror undergoing a reciprocating movement) rotating in the opposite direction and at the same equivalent optical speed as the orientation turret, so as to achieve the inertial stability of the line-of-sight during the image integration time.

The advantage of the orientation turret according to the present invention is that it may dispense with this counter-rotation device, thanks to the use of the piezoelectric direct motor drive unit for orienting the line-of-sight of the optical block 4, in combination with the high torque capabilities of this type of motor drive.

Finally, with regard to the other specifications, in terms of inertial stabilization and compatibility with the spectral bands of the optronic unit, these are common to panoramic search applications by scanning and to passive or active tracking applications by aiming, and are therefore met by the orientable turret according to the invention, for the reasons already mentioned above.

When applied to panoramic searching by scanning, the parts moving in elevation of the orientation device according to the invention is servocontrolled in terms of position or speed in the inertial reference frame and makes it possible to cast a field of at least around 30° and to centre it on the horizon with movement of the platform of at least around ±30°, and the part moving in bearing makes it possible for the fork to be rotated through 360° about the bearing axis YY.

The orientation turret according to the invention is therefore particularly well suited for operating as a panoramic beam scanning turret for a search device, in a terrestrial, naval or airborne application. Also in this application, it allows inertial servocontrol of the line-of-sight at high frequencies, by fully exploiting the performance characteristics of the piezoelectric motors 13 and 14. In this application, the advantages of the orientation turret according to the invention in terms of minimizing the volume, the mass and the power consumption, and also the deleterious effects of drag and of reduced radius of action, and of the vibration compensation using an active method, thanks solely to the higher bandwidth of the servocontroller at high frequencies, are maintained and to them are added the advantages specific to this scanning search application, namely the simplification of the scanning function in step-and-stare mode by eliminating the counter-rotation device, thanks to the torque performance of the piezoelectric motor drive associated with the aforementioned specific control laws for the motors 13 and 14 of the turret according to the invention, and also a high orientation speed, reaching a 20° rotation in the line-of-sight in less than 50 ms, thus making it possible to achieve panoramic scanning refresh rates of about 1 to 2 Hz per 360° bearing field, and spatial addressing of at least ±45° in elevation with a field of at least 30° in elevation.

Of course, the principle of the invention also applies when only one of the two motors 13 and 14 is a travelling-wave piezoelectric motor.

Advantageously, the travelling-wave piezoelectric motors 13 and 14 used in the orientation turret according to the invention may also be of the type described and illustrated in Patent Application FR 06/06439, in which the stator of a motor is excited by two coaxial rings of piezoelectric elements each applied respectively against one of the two opposed radial faces of the annular stator, to which patent application the reader may refer for further details on this subject.

The invention claimed is:

1. An orientation device of what is called "two axis" orientation head or turret type, for orienting at least one transmission assembly for transmitting at least one beam selected in the group comprising optical and electromagnetic beams in at least one direction selected in elevation and bearing, by rotation of said transmission assembly about at least one of an elevation axis and a bearing axis respectively, in which device said transmission assembly is mounted so as to pivot on a fork about a first axis, called the elevation axis, and capable of being rotated about said elevation axis by a first motor supported by said fork, which fork is mounted so as to pivot on a base about a second axis, called the bearing axis, perpendicular to the elevation axis, and capable of being rotated about said bearing axis by a second motor supported by said base, wherein at least one of said first and second motors is a travelling-wave piezoelectric rotary motor comprising:

a stator comprising a cogged stator ring of circular cross section, supported by said fork or said base respectively;

a rotor comprising an annular rotor slider of circular cross section, substantially coaxial with said cogged stator ring about said elevation or bearing axis and being pressed axially against said stator ring by a prestressing force; and at least one piezoelectric ring with excitation sectors for exciting said cogged stator ring, said piezoelectric ring also being substantially coaxial with said cogged stator ring about said corresponding elevation axis or bearing axis and applied against a radial face of said cogged stator ring so as to be able to excite said cogged stator ring and to cause a rotary displacement of said rotor when said excitation sectors of said piezoelectric ring are supplied with an exitation electrical current, wherein said annular rotor slider of at least one piezoelectric rotary motor is made to rotate as one with a driven member integral with one of said transmission assembly and fork respectively and rotated about said corresponding elevation axis or bearing axis by said piezoelectric rotary motor, and wherein said driven member integral with said transmission assembly is a first support for said assembly, which is mounted so as to swivel via said first support about said elevation axis on a first of two arms of said fork, between which arms said transmission assembly pivots.

2. The orientation device according to claim 1, wherein each of said first and second motors is a travelling wave piezoelectric rotary motor.

3. The orientation device according to claim 1, wherein said first motor is a piezoelectric rotary motor, said annular slider of said rotor of which is directly integrated into said first support for the transmission assembly, being produced so as to project coaxially about said elevation axis on a radial face of said first support that faces said cogged stator ring of said first motor, which stator ring is supported by said first arm of said fork.

4. The orientation device according to claim 1, wherein said first motor is a piezoelectric rotary motor, said annular rotor slider of said rotor of which is directly integrated into an axial end of an elevation drive shaft substantially coaxial with said rotor slider about said elevation axis and made to rotate as one with said first support for said transmission assembly about said elevation axis.

5. The orientation device according to claim 1, wherein said transmission assembly is fastened between said first support and a second support, which is mounted so as to swivel about said elevation axis in said second arm of said fork by means of an axially sliding arrangement that couples said transmission assembly to an elevation encoder assembly capable of measuring the rotation of said transmission assembly about said elevation axis.

6. The orientation device according to claim 5, wherein said second support for said transmission assembly is extended, along said elevation axis, by a cylindrical trunnion mounted so as to rotate about said elevation axis and to slide axially in a coaxial bore made in a hub of a disc of circular cross section rotationally guided about said elevation axis in said second arm of said fork by at least one rolling bearing, said hub also being extended, coaxially about said elevation axis, by a cylindrical end-piece engaged coaxially in said elevation encoder assembly, comprising an optical encoder mounted in said second arm of said fork, said disc being rotationally linked to said second support by means for preventing rotation about said elevation axis.

7. The orientation device according to claim 1, wherein said cogged stator ring of said stator and said at least one piezoelectric ring of said first motor are supported, coaxially about said elevation axis, projecting on a radial face, turned toward said transmission assembly, of a flange fastened to said first arm of said fork in order to support said first motor.

8. The orientation device according to claim 1, wherein said driven member integral with said fork is a support-plate of said fork and arranged in the form of an annular disc via which said fork is mounted so as to swivel about said bearing axis on an annular plate of said base, central orifices of said disc of said fork and of said plate of said base allowing passage of at least one of a beam and means for emitting at least one beam towards said transmission assembly and/or receiving at least one beam coming from said transmission assembly.

9. The orientation device according to claim 8, wherein said second motor is a piezoelectric rotary motor, said annular rotor slider of said rotor of which is directly integrated into said annular disc of said fork by projecting on a radial face of said annular disc which is turned towards said base.

10. The orientation device according to claim 8, wherein said second motor is a piezoelectric rotary motor, said annular rotor slider of said rotor of which is directly integrated into an axial end of a bearing drive shaft, which is tubular and integral with said annular disc of said fork and emerges, along said bearing axis, facing said transmission assembly, through said central orifice of said annular disc for passage of at least one of a beam and means for emitting at least one beam towards said transmission assembly and/or receiving at least one beam coming from said transmission assembly.

11. The orientation device according to claim 8, wherein said cogged stator ring of said stator and said at least one piezoelectric ring of said second motor are supported so as to project, coaxially about said bearing axis, on a radial face of said annular plate of said base which is turned towards said fork.

12. The orientation device according to claim 8, wherein said second motor is a piezoelectric rotary motor coupled on said base to a bearing encoder assembly capable of measuring the angular rotation of said fork about said bearing axis.

13. The orientation device according to claim 12, wherein said second piezoelectric rotary motor and said bearing encoder assembly are associated in a motor/encoder assembly mounted on said base so that said second motor and said bearing encoder are located substantially on either side of said annular plate of said base.

14. The orientation device according to claim 2, wherein said annular rotor slider of said rotor of said first and said second piezoelectric rotary motors and each member made to rotate as one with said slider pass through rolling-bearing mechanisms supported by said fork and said base respectively.

15. The orientation device according to claim 1, wherein said transmission assembly is a laser-compatible optical block comprising a biprism or an assembly of at least two mirrors.

16. An orientation device of what is called "two axis" orientation head or turret type, for orienting at least one transmission assembly for transmitting at least one beam selected in the group comprising optical and electromagnetic beams in at least one direction selected in elevation and bearing, by rotation of said transmission assembly about at least one of an elevation axis and a bearing axis respectively, in which device said transmission assembly is mounted so as to pivot on a fork about a first axis, called the elevation axis, and capable of being rotated about said elevation axis by a first motor supported by said fork, which fork is mounted so as to pivot on a base about a second axis, called the bearing axis, perpendicular to the elevation axis, and capable of being rotated about said bearing axis by a second motor supported by said base, wherein at least one of said first and second motors is a travelling-wave piezoelectric rotary motor comprising:

a stator comprising a cogged stator ring of circular cross section, supported by said fork or said base respectively;

a rotor comprising an annular rotor slider of circular cross section, substantially coaxial with said cogged stator ring about said elevation or bearing axis and being pressed axially against said stator ring by a prestressing force; and at least one piezoelectric ring with excitation sectors for exciting said cogged stator ring, said piezoelectric ring also being substantially coaxial with said cogged stator ring about said corresponding elevation axis or bearing axis and applied against a radial face of said cogged stator ring so as to be able to excite said cogged stator ring and to cause a rotary displacement of said rotor when said excitation sectors of said piezoelectric ring are supplied with an exitation electrical current, wherein said annular rotor slider of at least one piezoelectric rotary motor is made to rotate as one with a driven member integral with said fork and rotated about said bearing axis by said piezoelectric rotary motor, and wherein said driven member integral with said fork is a support-plate of said fork and arranged in the form of an annular disc via which said fork is mounted so as to swivel about said bearing axis on an annular plate of said base, central orifices of said disc of said fork and of said plate of said base allowing passage of at least one of a beam and means for emitting at least one beam towards said transmission assembly and/or receiving at least one beam coming from said transmission assembly.

17. The orientation device according to claim 16, wherein each of said first and second motors is a travelling wave piezoelectric rotary motor.

18. The orientation device according to claim 16, wherein said second motor is a piezoelectric rotary motor, said annular rotor slider of said rotor of which is directly integrated into said annular disc of said fork by projecting on a radial face of said annular disc which is turned towards said base.

19. The orientation device according to claim 16, wherein said second motor is a piezoelectric rotary motor, said annular rotor slider of said rotor of which is directly integrated into an axial end of a bearing drive shaft, which is tubular and integral with said annular disc of said fork and emerges, along said bearing axis, facing said transmission assembly, through said central orifice of said annular disc for passage of at least one of a beam and means for emitting at least one beam towards said transmission assembly and/or receiving at least one beam coming from said transmission assembly.

20. The orientation device according to claim 16, wherein said cogged stator ring of said stator and said at least one piezoelectric ring of said second motor are supported so as to project, coaxially about said bearing axis, on a radial face of said annular plate of said base which is turned towards said fork.

21. The orientation device according to claim 16, wherein said second motor is a piezoelectric rotary motor coupled on said base to a bearing encoder assembly capable of measuring the angular rotation of said fork about said bearing axis.

22. The orientation device according to claim 21, wherein said second piezoelectric rotary motor and said bearing encoder assembly are associated in a motor/encoder assembly mounted on said base so that said second motor and said bearing encoder are located substantially on either side of said annular plate of said base.

23. The orientation device according to claim 17, wherein said annular rotor slider of said rotor of said first and said second piezoelectric rotary motors and each member made to rotate as one with said slider pass through rolling-bearing mechanisms supported by said fork and said base respectively.

24. The orientation device according to claim 16, wherein said transmission assembly is a laser-compatible optical block comprising a biprism or an assembly of at least two mirrors.

* * * * *